US008642058B2

(12) United States Patent
Benaddi et al.

(10) Patent No.: US 8,642,058 B2
(45) Date of Patent: Feb. 4, 2014

(54) POLYMERIC COMPOSITION FOR THE NEUTRALIZATION OF NOXIOUS AGENTS

(75) Inventors: Hamid Benaddi, Granby (CA); Heidi Schreuder-Gibson, Holliston, MA (US)

(73) Assignees: U.S. Army Natick Soldier Research, Development and Engineering Center Chemical Technology Team, Natick, MA (US); Stedfast Inc. (CA)

( * ) Notice: Subject to any disclaimer, the term of this patent is extended or adjusted under 35 U.S.C. 154(b) by 591 days.

(21) Appl. No.: 12/732,881

(22) Filed: Mar. 26, 2010

(65) Prior Publication Data

US 2011/0236689 A1 Sep. 29, 2011

(51) Int. Cl.

| | |
|---|---|
| ***A01N 25/32*** | (2006.01) |
| ***A62D 3/36*** | (2007.01) |
| ***C01B 31/12*** | (2006.01) |
| ***A62D 5/00*** | (2006.01) |
| ***B32B 27/08*** | (2006.01) |
| ***B05D 3/02*** | (2006.01) |

(52) U.S. Cl.

USPC ........... 424/406; 252/184; 588/313; 588/317; 588/400; 588/401; 588/402; 428/306; 428/307.3; 428/316.6; 428/317.7; 428/319.3; 422/76; 422/77; 422/121

(58) Field of Classification Search

USPC ........... 252/184; 424/406; 588/313, 317, 400, 588/401, 402; 428/306, 307.3, 316.6, 428/317.7, 319.3; 422/76, 77, 121

See application file for complete search history.

(56) References Cited

U.S. PATENT DOCUMENTS

| | | | |
|---|---|---|---|
| 4,943,475 A | 7/1990 | Baker et al. | |
| 5,391,426 A * | 2/1995 | Wu | 442/76 |
| 6,395,383 B1 | 5/2002 | Maples | |
| 6,395,678 B1 * | 5/2002 | Summers et al. | 502/416 |
| 7,736,664 B2 * | 6/2010 | Benaddi | 424/406 |
| 2008/0264254 A1 * | 10/2008 | Song et al. | 95/116 |
| 2009/0218291 A1 * | 9/2009 | Mitchell et al. | 210/692 |

FOREIGN PATENT DOCUMENTS

| | | |
|---|---|---|
| CA | 2 501 146 | 5/2009 |
| EP | 1 700 620 A2 | 9/2006 |

* cited by examiner

*Primary Examiner* — Joseph D Anthony

(74) *Attorney, Agent, or Firm* — Riverside Law LLP

(57) ABSTRACT

The present application is directed to a novel composition which acts as a barrier to noxious agents while adding self-detoxifying catalytic treatments to neutralize the noxious and harmful warfare agents when applied for example on a fabric, or other solid support.

15 Claims, 5 Drawing Sheets

POLYMERIC COMPOSITION FOR THE NEUTRALIZATION OF NOXIOUS AGENTS

BACKGROUND OF THE INVENTION

Protection of people against chemical and biological agents is very important and is very necessary in the present world environment. Functional protective clothing and equipment are required for many workers such as firefighter, police officers, medical workers, chemical and biological researchers, environmental health workers, pesticide handlers and soldiers. In order to contribute to the improvement and maintenance of the health and well-being of workers exposed to chemical substances and biological agents, there is a need to develop, for their safeguard, an effective, rapid, and safe decontamination technology applied to the functional clothing and equipment. Indeed, as protective clothing and equipment have to be decontaminated before they are, for example taken off to avoid the agents from being transferred to the skin or cloth underneath and taken to an unprotected area, there is a need to develop a composition which, when applied to a fabric, will show an enhanced protection against noxious warfare agents by adding a self-detoxifying catalytic effect in neutralizing the chemical and/or biological warfare agents present in the environment.

The protective clothing and equipment are expected to provide protection for the users against a variety of noxious agents without having a negative impact on the performance of the users. More particularly, the clothing and equipment have to maintain personal comfort and ensure safety.

In the field of chemical protection against chemical and/or biological warfare agents, the ideal protective fabric, membrane, clothing or equipment should be lightweight, breathable and should selectively block toxic agents. This approach relies, amongst other things, on the use of selectively permeable materials. Indeed, the selective permeable membranes or semi-selective permeable materials present different advantages compare to non-breathable product especially regarding comfort. Indeed, selective permeable materials are flexible, they possess characteristics that facilitate the transport of water vapor, they allow moisture to penetrate the materials to provide, for example, comfort to the wearer, and they block entry of chemical, biological noxious or harmful agents. The use of selectively permeable materials is well known in the art and is described, for example, in U.S. Pat. Nos. 4,943,475, 5,391,426, and 6,395,383, in European Patent Applications Nos. 1700620A2, and 06300223.2, and in Canadian Patent No. 2,501,146. Generally, selectively permeable materials that possess high water vapor transmission are hydrophilic polymers like polyethylenimine (PEI) or amine polymers combined with other polymer such as polyvinyl alcohol (PVOH), and polyvinyl alcohol co-ethylene. However, not all of these hydrophilic polymers show a high catalytic effect in neutralizing the chemical, biological, noxious or harmful agents, but combinations of such materials can be prepared to enhance chemical and biological neutralization.

Canadian Patent No. 2,501,146 and U.S. patent application Ser. No. 11/081,149 filed on Mar. 15, 2005 owned by Stedfast describe a composition which can act as a barrier against harmful or noxious agents when applied to a fabric or other solid support. The composition that shows enhanced resistance to water and laundering can better adhere to fabric or other solid supports and has enhanced water vapor permeability. This composition comprises from 5 to 80% by weight of a polyvinyl acetate polymer or copolymer, from 5 to 20% by weight of an aliphatic amine, from 0 to 20% by weight of a polyvinyl alcohol or copolymer thereof, from 0.1 to 10% by weight of a surfactant, from 0 to 5% by weight of one or more metal salts or metal oxides, from 0.1 to 10% by weight of an epoxy resin or of a cross-linking agent, from 0.5 to 10% by weight of a defoamer agent and from 10 to 90% by weight of water. However, this composition, while showing enhanced resistance to water and laundering and blocking efficiently the harmful or noxious agents, possesses a limited potential in neutralizing rapidly the noxious and harmful chemical and biological agents. Indeed, this composition does not provide to a membrane a self-detoxifying catalytic treatment to neutralize the noxious chemical and/or biological warfare agents present in the environment.

Therefore, there is a need to develop selectively permeable fabrics or even air permeable materials that offer an enhanced protection against noxious warfare agents by adding a catalytic effect to neutralize the harmful or noxious agents present in the environment at different level of relative humidity. This catalytic effect is performed, for example, by the hydrolysis of chemical warfare agents and to Toxic Industrials Chemicals (TIC's) compounds.

It is well known in the art that activated carbon is a form of carbon that has been processed to make it extremely porous and thus to have a very large surface area available for adsorption and filtration. Activated carbons are used primarily for purifying gases for adsorption, solvent recovery, or deodorization and as an antidote to certain poisons. More particularly, activated carbon can be used as a substrate to improve the adsorptive capacity for some noxious or harmful agents and has selective adsorption properties to different gas and chemicals. Also, carbon technology presents some advantage for comfort as it allows venting. However, protective garment based on activated carbon technologies, which allow air transfer, do not provide protection such as one describes in this invention. Indeed, carbon based technologies have a limited adsorption capacity and once a membrane, material or garment is saturated, the carbon is no longer a barrier to the harmful or noxious agents and, of course, there is no indication when occurs this lost of protection.

Therefore, there is a need to develop a composition which acts as a barrier to harmful and noxious warfare agents, has enhanced water vapor permeability and presents a catalytic effect in neutralizing the harmful and noxious agents at different relative humidity levels. The composition of the present invention when applied to a membrane, textiles woven, knit or tricot, material tents, shelters, tanks, canisters, filter media or garment presents an enhanced protection against chemical, biological noxious or harmful agents by allowing their neutralization and hydrolysis.

SUMMARY OF THE INVENTION

The invention relates to a composition which, when applied to a support, acts as a barrier to noxious chemical or biological warfare agents by adding a self-detoxifying catalytic treatment to neutralize the noxious agents. The composition of the present invention comprises from 1 to 95% by weight of a porous media, from 2 to 60% by weight of an aliphatic amine or any hydrophilic amine polymer or monomer, and from 10 to 90% by weight of water. Optionally, the composition of the present invention can also comprise from 0 to 10% by weight of a surfactant agent, from 0 to 10% by weight of an epoxy resin or of a crosslinking agent, from 0 to 90% by weight of a polyvinyl acetate polymer or copolymer, from 0 to 20% by weight of a polyvinyl alcohol polymer or copolymer, from 0 to 60% by weight of a polyurethane polymer, from 0 to 60% by weight of an acrylic polymer, from 0 to 5% by weight of one or more metal salts or metal oxides, from 0 to 10% by weight of defoamer agent and from 10 to 90% by weight of water. The porous media is zeolite or activated carbon in the form of powder, beads, granules, nanotubes, fiber, woven cloth, non-woven cloth, knit cloth, filter or a combination thereof. In another embodiment, the aliphatic amine or hydrophilic amine polymer or monomer is replaced by a vinyl amine and polyvinyl alcohol copolymer.

The invention also relates to a process for the preparation of a laminated support comprising activated carbon in the form of powder, beads, granules or nanotubes, the process comprising the following steps: a) mixing the components of the composition; b) applying the composition to a selected support to form a laminated support; and c) curing the resulting laminated support at a temperature at a range of 100 to 220° C. In another embodiment, the porous media is premix with an aliphatic amine or hydrophilic amine polymer or copolymer or with a vinyl amine and polyvinyl alcohol copolymer before the addition of the remaining components.

In another embodiment, the invention relates to a process for the preparation of a laminated support comprising a carbon fabric, the process comprising the following steps: a) impregnating the components of the composition with the carbon fabric; and b) curing the resulting laminated support at a temperature at a range of 100 to 220° C.

The laminated support of the present invention can comprise one or more layers of the composition of the present invention. In another embodiment, the laminated support comprises one or more layers of the composition of the present invention combined with one or more layers of the composition comprising from 2 to 60% by weight of an aliphatic amine or hydrophilic amine polymer or monomer, from 0 to 10% by weight of a surfactant agent, from 0 to 10% by weight of an epoxy resin or of a crosslinking agent, from 0 to 90% by weight of a polyvinyl acetate polymer or copolymer, from 0 to 20% by weight of a polyvinyl alcohol polymer or copolymer, from 0 to 60% by weight of a polyurethane polymer, from 0 to 60% by weight of an acrylic polymer, from 0 to 5% by weight of one or more metal salts or metal oxides, from 0 to 10% by weight of a defoamer agent and from 10 to 90% by weight of water.

If desired, the resulting laminated support may be secured to a further solid support.

DETAILED DESCRIPTION OF THE INVENTION

Figure 1:
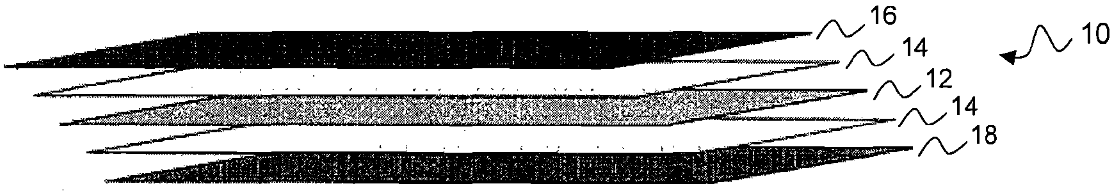
FIG. 1 is a schematic cross-sectional view of a laminated support prepared in accordance with the present invention.

The present invention relates to a composition which shows, when applied for example to a fabric, an enhanced protection against noxious chemical warfare agents by adding a catalytic effect in neutralizing the chemical and/or biological warfare agents present in the environment. The present invention relates to a composition effective for the neutralization and the decontamination of chemical and biological compounds or agents.

The present invention includes a general composition that protects and acts as a barrier against harmful and noxious warfare agents while adding self-detoxifying catalytic treatment to neutralize the harmful and noxious agents at different relative humidity levels when applied for example, on a fabric, or other solid support.

DEFINITIONS

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein, "about" when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

DESCRIPTION OF THE INVENTION

Harmful or noxious agents are defined as any chemical or biological agents which, through its chemical or biological action on life processes, can cause death, temporary incapacitation, or permanent harm to humans or animals. This includes all such chemical or biological agents, regardless of their origin or of their method of production, and regardless of whether they are produced in facilities, in munitions or elsewhere. As used herein, harmful or noxious agents are chemical warfare agents and toxic industrial compounds set out in NFPA 1994, NATO standard regarding CBRN protection, Standard on Protective Ensembles for Chemical/Biological Terrorism Incidents. These include but are not limited to Lewisite (L), Mustard gas (HD), Sarin (GB), Soman (GD), VX, dimethyl sulfate, ammonia, chlorine, cyanogen chloride, carbonyl chloride and hydrogen cyanide.

In the context of the present invention, neutralization is defined as the capacity of detoxifying, counteracting, decontaminating, rendering ineffective, or breaking down the chemical or biological agents to the level that the chemical or biological agents are no longer harmful, damaging, or dangerous to humans or animals.

The present invention relates to a composition comprising:

(a) from 1 to 95% by weight of a porous media;

(b) from 2 to 60% by weight of an aliphatic amine or any hydrophilic amine polymer or monomer; and (c) from 10 to 90% by weight of water.

The composition can also optionally comprise:

(d) from 0 to 10% by weight of a surfactant agent;

(e) from 0 to 10% by weight of an epoxy resin or of a crosslinking agent;

(f) from 0 to 90% by weight of a polyvinyl acetate polymer or copolymer;

(g) from 0 to 20% by weight of a polyvinyl alcohol polymer or copolymer;

(h) from 0 to 60% by weight of a polyurethane polymer;

(i) from 0 to 60% by weight of an acrylic polymer;

(j) from 0 to 5% by weight of one or more metal salts or metal oxides; and (k) from 0 to 10% by weight of defoamer agent.

The role of the porous media in the composition is to increase the kinetics of the reaction between water and noxious chemicals. There are a variety of types of activated carbon and it includes a wide range of amorphous carbon-based materials that exhibit a high degree of porosity and an extended surface area and also different surface chemistry. The activated carbon has excellent adsorbent characteristics. The activated carbon is often combined with other minerals like zeolite. Activated carbon or zeolite is used as adsorption media to adsorb chemicals in air or water. The objective to add activated carbon or porous media or zeolite to the composition is to increase surface contact between noxious and harmful agents and the components of the composition. More particularly, the components of the composition, for example the aliphatic amine, will enter in close relation, form an association, join or interpenetrate into the activated carbon material to enhance the hydrolysis reaction of the noxious and harmful agents. This will induce the neutralization of the noxious and harmful agents or the modification of their chemical structure leading to their inactivation. All activated carbon materials tested during this study show different levels of reaction when combined with amine polymers. Also, it was noted that pore size distribution and surface chemistry have some influence on catalytic effect. Examples of activated carbon used in the present invention include, but are not limited to, activated carbon obtained using chemical activation, physical activation, hydrophilic or hydrophobic activated carbon, hydrophilic carbon obtained by physical or chemical treatment or by adding salts or hygroscopic chemicals, carbon black, and different raw materials such as coconut shell, woods and the likes. Further, zeolite porous media could be used as a support for catalysis. It will be understood by the skilled person in the art that any appropriate activated carbon, zeolite, or clay material can be selected based on the desired results (for example, membrane and/or protection). It will be understood by a person skilled in the art that the activated carbon could be in the form of powder, beads, granules, nanotubes, fiber, non-woven, woven or knit cloth, and filter. Also, a person skilled in the art will recognize that a combination of different types of activated carbon or activated carbon and zeolite can be used in the preparation of the composition of the present invention.

Aliphatic amines or hydrophilic amine polymers or monomers are water-soluble cationic polymers commonly used in ion exchange columns to remove anions from solutions. They are used as a barrier against oxygen penetration in the food industry and have been found to provide good properties in film form as barrier against chemical warfare agents. Aliphatic amines or hydrophilic amine polymers or monomers used according to the present invention include, but are not limited to, polyethylenimine, poly(vinylamine)-co-vinyl alcohol, and polyvinylamine. Preferred aliphatic amines or hydrophilic amine polymers or monomers are polyethylenimine and poly(vinylamine)-co-vinyl alcohol. The aliphatic amine or hydrophilic amine polymer or monomer is present in a weight ratio from about 2 to 60%, and preferably from about 10 to 30%. When the aliphatic amines or hydrophilic amine polymers or monomers, as for example the polyethylenimine, are interpenetrated into an activated carbon material, they will serve as a base-catalyzed hydrolysis sites on the surface of the activated carbon. Furthermore, the combination of an aliphatic amine or hydrophilic amine polymer or monomer with activated carbon increases the hydrolysis kinetics of noxious and harmful agents.

Surfactants provide multifunctional properties such as reduction of the surface tension, greater resistance to washing and laundering, and foam control. Test results have shown that the addition of a surfactant to the coating composition allows the membrane to resist ten washing cycles at 60° C. and up to 20 dry cleaning cycles. In the absence of surfactant, delamination occurs after less than three washing cycles, even using cold water. Surfactants used according to the present invention include, but are not limited to, 2,4,7,9-tetramethyl-5-decyne-4,7-diol. The person skilled in the art would know that, in the context of the present invention, any surfactants which allow a greater dispersion or air release from the solution or mixture could be used. The surfactant is present in a weight ratio from 0 to 10%, preferably from about 0.1 to 10%, and most preferably from about 1 to 3%.

The role of the epoxy resin or of the crosslinking agent in the composition is to increase the adhesion of the laminate with the solid support and to reduce the curing time. Many types of crosslinking agents can be used in the present invention as, for example, but are not limited to, aziridine, 2-dimethylaminoethanol, melamine-formaldehyde resins, and polyamide-epichlorohydrin (Polycup 172, Hercules Inc.). The epoxy resin or the crosslinking agent is present in a weight ratio from about 0 to 10%, preferably from about 0.1 to 10%, and most preferably from about 0.1 to 3%. Example of the mechanism involved in the present invention is similar to the crosslinkage of polyurethanes coated fabric for inflatable structure such as live vest, emergency slide or other example in the role of water for moisture curing adhesive.

The presence of polyvinyl acetate polymer or copolymer when applied as a coating on membranes provides an improvement of adhesion of the composition once applied to a support while improving resistance to water and preventing it from swelling when contacted with water. Polyvinyl acetate polymers or copolymers used according to the present invention include, but are not limited to, ethylene vinyl acetate. The polyvinyl acetate polymer or copolymer is generally present in a weight ratio from about 0 to 90%, preferably from about 5 to 20% and most preferably from about 20 to 50% by weight. Polyvinyl acetate polymer confers to the composition, when applied for example, to a fabric or other solid support, a greater resistance to water and laundering. Membranes or fabrics laminated with the composition of the present invention comprising polyvinyl acetate polymer could be considered reusable because they offer a good chemical protection after laundering. Indeed, there is always a need to consider the environmental impact of disposable versus reusable protective textile in function of their application.

Polyvinyl alcohol polymer or copolymer is a versatile water-soluble polymer used as an adhesive promoter in the preparation of films. The presence of a polyvinyl alcohol polymer or copolymer in the composition of the present invention is optional. Polyvinyl alcohol polymers or copolymers used according to the present invention include, but are not limited to, combinations of low and high molecular weight Airvol® 103 and Airvol® 125. The polyvinyl alcohol polymer or copolymer is generally present in a weight ratio from about 0 to 20%, and preferably from about 5 to 10%.

It will be understood by a person skilled in the art that any known formulation which is the combination, for example, of an aliphatic amine polymer and a polyvinyl alcohol polymer or copolymer, could be used in the preparation of the composition of the present invention. For example, in one embodiment, the selectively permeable coating may comprise a polyvinyl alcohol polymer and a vinyl amine copolymer like the commercial product ERKOL® L12.

In another embodiment, the composition can comprise other polymers like polyurethane polymer or acrylic polymer which offer to the laminate composition a good chemical resistance.

Optionally, metal salts or metal oxides can be added to provide biocidal or anti-bacterial properties. The addition of metal salts or metal oxides to the composition does not reduce the barrier properties of the composition. Metal salts of metal oxides used according to the present invention include, but are not limited, to copper and silver in the state of salts or oxides. Preferred metal salts or metal oxides are copper and silver in the form of salts or oxides. The metal salts or metal oxides are generally present in a weight ratio from about 0 to 5%.

The defoamer agents are optionally added to the composition to remove bubbles, to promote the formation of a film having a uniform surface and to increase leveling. If bubbles are trapped into the film on the membrane, this would reduce the effective thickness of the film which allows chemicals to pass through it. The goal is to remove all bubbles from the mixture before coating it on the support or the membrane.

Defoamer agents used according to the present invention include, but are not limited to, 2,4,7,9-tetramethyl-5-decyne-4,7-diol and other commercial products such as SURFYNOL®DF58 (Air Products), ACRYSOL.® RM-2020NPR or RM-8W (Rohm and Haas), ARCOSOLV.®DPNB (Lyondell), BYK®-024, -333, -348 or Disperby®-190 (Byk-Chemie), DOWANOL.® DPnB or TPM (Dow Chemical), EXXATE.® 1200 (Exxon-Mobil Chemical), FOAMASTER.® VF (Cognis), HEUCOPHOS.® ZBZ, ZPO, ZPA ZMP or ZPZ (Heucotech Ltd. (Heubach)), PROGLYDE.®DMM (Dow Chemical), TAFIGEL.® PUR 60 (Münzing Chemie GmbH), TEXANOL.® ester alcohol (Eastman Chemical), TINUVIN.® 384 or 292 (Ciba Specialty Chemicals), TI-PURE.®-706 or R-960 (DuPont). The defoamer agents are generally present in a weight ratio from about 0 to 10% and preferably from about 0.1 to 10%.

To prepare the composition of the present invention, the desired amounts of a porous media such as activated carbon or zeolite, aliphatic amine or hydrophilic amine polymer or monomer, water and optionally, polyvinyl acetate polymer or copolymer, polyvinyl alcohol polymer or copolymer, polyurethane polymer or acrylic polymer are mixed. The solution is stirred while being heated at a temperature of between 20 to 100° C., preferably between 35 to 90° C. and most preferably between 50 to 60° C. for a period of time of 10 to 45 minutes. It will be understood by a person skilled in the art that the temperature and stirring time will vary having regard to the nature of the composition being prepared. The surfactant, the epoxy resin or crosslinking agent, the metal salts or metal oxides and the defoamer are added to the mixture when required.

In another embodiment, the composition of the present invention is prepared by mixing the desired amounts of an aliphatic amine or hydrophilic amine polymer or monomer with activated carbon particles for 10 to 20 hours prior to the addition of the final formulation ingredients. It will be understood by a person skilled in the art that the period of incubation of the aliphatic amine or hydrophilic amine polymer or monomer with activated carbon particles will vary having regard to the nature of the composition being prepared. In a preferred embodiment, the aliphatic amine or hydrophilic amine polymer or monomer is polyethyleneimine. Further to this step, the desired amounts of water and optionally polyvinyl acetate polymer or copolymer, polyvinyl alcohol, polyurethane polymer or acrylic polymer are mixed together with the polyethyleneimine/carbon premix. The solution is stirred while being heated at a temperature of between 80 to 100° C. for a period of time of 10 to 45 minutes. It will be understood by a person skilled in the art that the temperature and stirring time will vary having regard to the nature of the composition being prepared. If required, the surfactant, the epoxy resin or crosslinking agent, the metal salts or metal oxides and the defoamer are added to the mixture immediately prior to the coating application.

The resulting solution is applied on a solid support as a continuous film using a knife or any known process to make a continuous film. The solid support can be, but is not limited to, a water vapor-transmissive, breathable (permeable or semi-permeable support) or non-breathable membrane (impermeable support), woven or non-woven membrane, knit textile or carbon cloth. The thickness of the gel or film on the solid support is between 5 to 100 μm and, preferably, between 30 to 70 μm, depending on the barrier properties one wishes the laminated support to have. The laminated support is cured during 1 to 7 minutes at a temperature of between 100 and 220° C., preferably between 130 and 200° C. and most preferably between 140 and 160° C. The curing period and temperatures depend on the nature of the laminate composition and the selected solid support. Furthermore, the person skilled in the art will know how to select the best conditions of curing in order to stabilize the laminated support for, for example, the laundering.

It will be understood that, for the present invention, the composition can also be added directly to a carbon fabric such as carbon cloth, activated carbon cloth, woven or non-woven cloth, knit cloth, activated carbon particles as filter. For this specific embodiment, the carbon particles are omitted from the composition and the remaining and desired components, as an aliphatic amine polymer, is directly added to the carbon fabric to obtain the same performance and properties. The person skilled in the art would know how the apply the diverse components on the carbon fabric having regard to the desired result. The person skilled in the art would also know how to measure or calculate the carbon particles content in order to respect the weight percentage of the general composition. For example, an aliphatic amine or a hydrophilic amine polymer or monomer is mixed with water. A carbon fabric is added to the solution of an aliphatic amine or a hydrophilic amine polymer or monomer with water at a temperature range of 25 to 50° C. for impregnation. This resulting product is cured or dried during 1 to 7 minutes at a temperature of between 100 and 220° C., preferably between 130 and 200° C. and most preferably between 140 and 160° C. The curing period and temperatures depend on the nature of the laminate composition and the carbon fabric.

The laminated support can itself be applied to other supports depending on the properties one wishes the final product to have. This coating or laminated support will have good adhesion or binding properties to different commercially available membranes such as, but are not limited to, expanded polytetrafluoroethylene (ePTFE), polyvinyl chloride (PVC), polyurethane (PU), polyamide, polyester, or a blend thereof. One such product is illustrated in FIG. 1 and has applications in the military field as textile to make materials for protective suits and garments.

The product of FIG. 1 indicated generally as 10 comprises a thin film of a composition of the invention 12 applied between two polyurethane layers 14. A textile layer 16 is then applied to one side of the resulting laminate while a tricot layer 18 is applied to the other side. It will be understood by a person skilled in the art that a laminated support can be prepared using a variety of supports, depending on the end use of the finished product and the other properties one may wish to impart to such finished product. Indeed, it will be understood that the composition of the present invention is useful in a variety of applications where toxic chemical or biological contaminations may be of concern. For example, supports used according to the present invention include, but are not limited to, textiles woven, knit or tricot, material tents, shelters, tanks, canisters, filter media or garment.

Furthermore, it will be understood that the laminated support can comprise one or more layers of the composition of the present invention, which layers can have different compositions and different physical properties. As an example, one layer could comprise a blend of an activated carbon, an aliphatic amine and a polyvinyl acetate polymer while another layer could be exempt of the polyvinyl acetate. In another example, the composition of the first layer could comprise activated carbon or carbon fabric while the composition of the second layer could be prepared without activated carbon or carbon fabric or zeolite or porous media. Therefore, the resulting laminated support provides a first layer which adds a catalytic effect in neutralizing the chemical and/or biological warfare agents while the second layer acts as a barrier to noxious agents while showing enhanced moisture vapor permeability and resistance to water and laundering. As another example, the resulting laminated support can be a superposition of layers comprising a composition in which the porous media is a combination of activated carbon and zeolite.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Example 1

DFP Degradation Evaluated on Treated Activated Carbon Cloth

Using the procedure set out above, the following compositions were prepared:

| Weight percentage (%) | | | |
|---|---|---|---|
| Control | LP | LPA | |
| 100 | 46 | 46 | activated carbon cloth woven or knit |
| 0 | 0 | 2 | polyvinyl acetate |
| 0 | 4 | 4 | polyethylenimine (lupasol) |
| 0.1 | 0.1 | 0.1 | cross-linking agent |
| 0 | 0 | 0.1 | defoamer |
| 0 | 49.9 | 47.8 | water |

Fabric Designation
Control (carbon fabric- untreated)
Stedfast LP (treated carbon fabric treatment 1)
Stedfast LPA (treated carbon fabric treatment 2)

The composition was cured at 160° C. to remove water and to crosslink the polymers. The three carbon fabrics were tested for DFP (diisopropyl fluorophosphate) reactivity testing by nuclear magnetic resonance (NMR). The DFP agent resembles to known toxic chemical agents like tabun, sarin, so man, cyclosarin and the likes and has been used by military forces as a substitute for such agents in training drills and top-secret experiments. DFP is a structural analog of sarin.

Testing:

The fabrics were equilibrated in a sealed chamber with a water bath producing an environment of 100% relative humidity (RH) or in a desiccator containing a saturated solution of NaBr to produce a humidity of 70% RH at 27° C.; conditioning was held for at least 7 days to ensure full hydration. Then, 20 to 30 mg of material was cut to approximately 2 mm×2 mm size and placed in a NMR rotor (50 μl sample volume) along with 5 μl of DFP liquid applied to the top surface of the packed samples conditioned at 100 RH.

Measurement of DFP destruction by hydrolysis reaction was followed using a Bruker Avance 400 spectrometer. The high-resolution magic angle spinning (HRMAS) 31P spectra was recorded with a 4-mm Bruker $^{31}$P gradient probe at a temperature of 20° C. using standard Bruker software sequences. The sample was spun at 5 kHz with 90° pulse widths of 6 μs and an overall acquisition time of 5 minutes. An untreated carbon fabric was used as a control.

Figure 2:
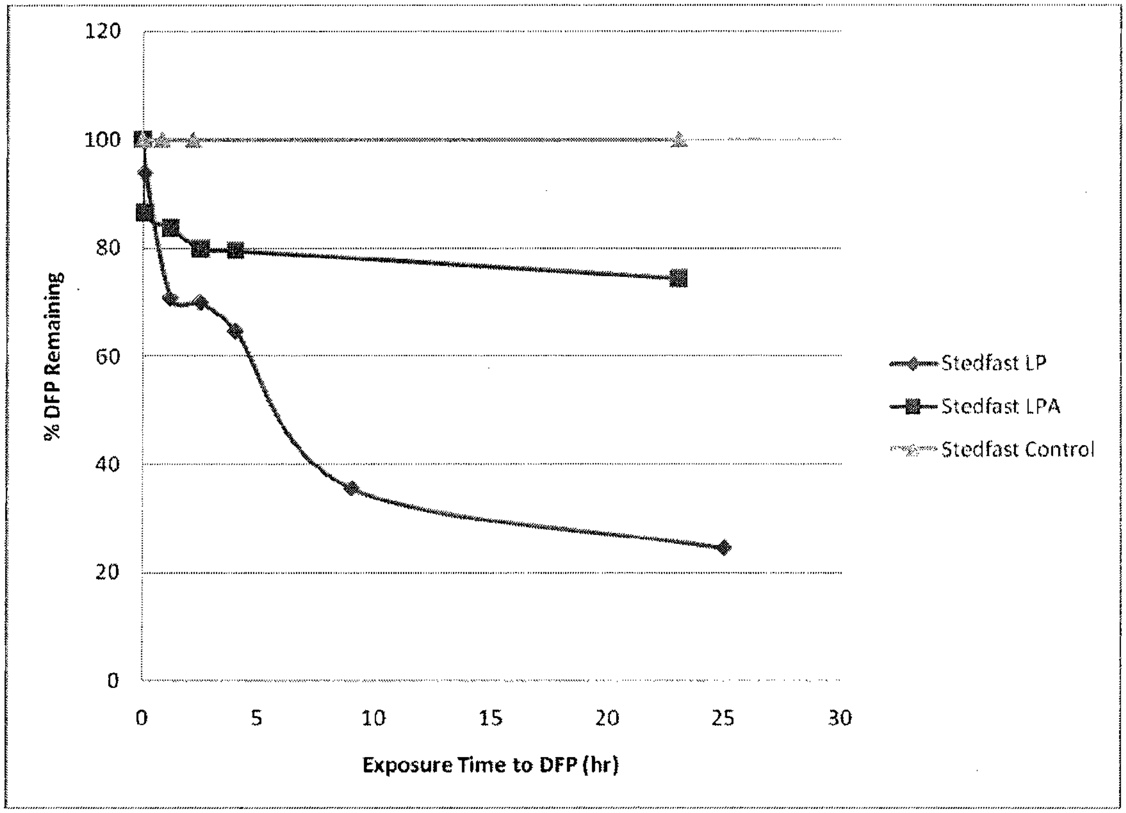
FIG. 2 is a graphic showing the effect of carbon treatment on depletion time of diisopropyl fluorophosphate (DFP) at 100% of relative humidity.

Results:

The results, presented in Table 1 and FIG. 2, indicate that the treated carbon fabrics Stedfast LP and LPA are capable of breaking down DFP to some extent, but not completely. More particularly, results of percent depletion of DFP at 24 hours demonstrate that the treated carbon fabric Stedfast LP is slightly more efficient than the treated carbon fabric Stedfast LPA in the destruction of DFP.

TABLE 1

DFP depletion at 23-25 hr for polymer-impregnated carbon fabric samples

| SAMPLE | % Depletion of 5 uL DFP At 100% RH (Hours) | % Depletion of 2 uL DFP At 70% RH (Hours) |
|---|---|---|
| Stedfast Control | 0 (23 hr) | 0 (24 hr) |
| Stedfast LP | 75.4 (25 hr) | 40.3 (24 hr) |
| Stedfast LPA | 25.6 (23 hr) | 46.8 (24 hr) |

Example 2

Effect or Carbon Content on DFP Depletion Times Evaluated at Different Level of Relative Humidity The following composition was prepared:

| Ingredient | Weight percentage (%) | Description |
|---|---|---|
| Calgon ADP | 2.0 | Activated carbon |
| PVAM L12 Polymer | 4.4 | Erkol (L12) Mn 35,000 Da, Celanese |
| PEI Polymer | 3.6 | Polyethyleneimine branched, Mn 10,000 Da, Aldrich 408727 |
| Polycup 172 | 1.0 | Crosslinking agent Polycup 172, Hercules Inc. |
| Water | 89 | |

The same composition without activated carbon was also prepared as a control. The composition was cast as a continuous film, dried and crosslinked at 100° C. for 1 hour. The final film composition was 20 wt % carbon in the crosslinked PVAM/PEI (55/45) film.

Testing:

The membranes were equilibrated in a sealed chamber with a water bath producing an environment of 100% RH or in a desiccator containing a saturated solution of KCl to produce a humidity of approximately 84% RH at 27° C.; conditioning was held for at least 7 days to ensure full hydration. Then, 20-30 mg of material was cut to approximately 2 mm×2 mm size and placed in an NMR rotor (50 μl sample volume) along with 2 μl of DFP liquid applied to the top surface of the packed sample. Measurement of DFP destruction by hydrolysis reaction was followed using a Bruker Avance 400 spectrometer the high-resolution magic angle spinning (HRMAS) $^{31}$P spectra were recorded with a 4-mm Bruker $^{31}$P gradient probe at a temperature of 20° C. using standard Bruker software sequences. The sample was spun at 5 kHz with 90° pulse widths of 6 μs and an overall acquisition time of 5 minutes. A membrane, in which the activated carbon was not included in the film composition, was used as a control.

Figure 3:
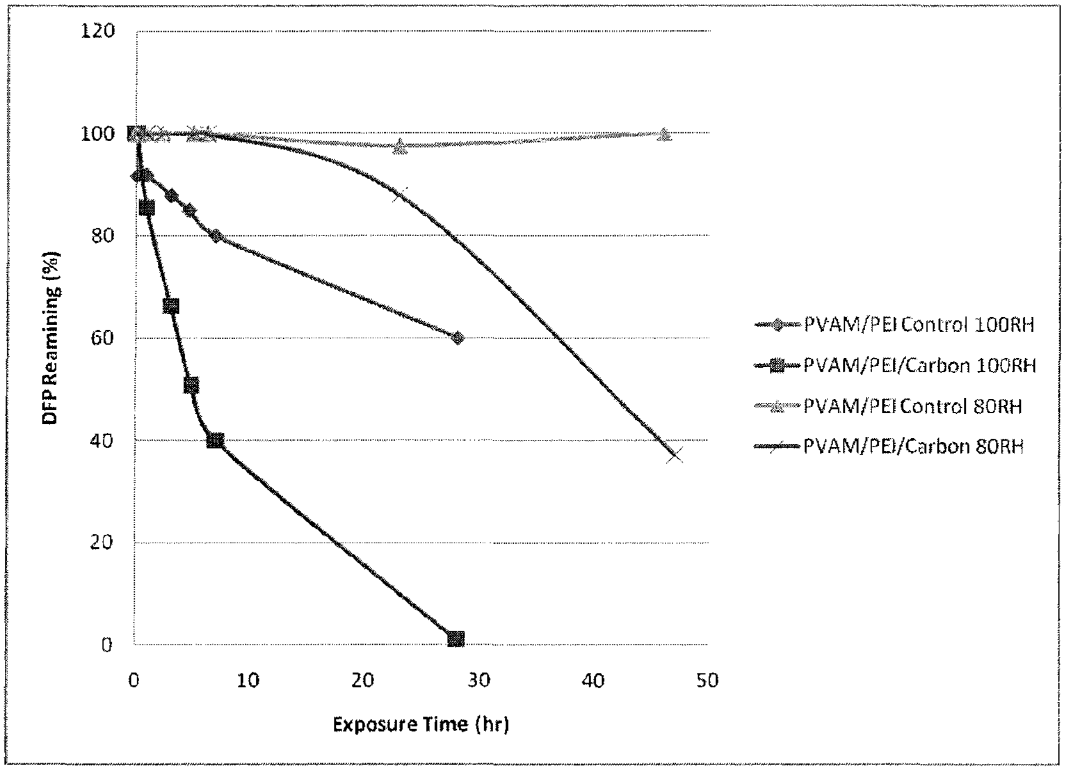
FIG. 3 is a graphic showing the effect of carbon content on DFD depletion times in L12-PEI membranes at 100% and 80% relative humidity.

Results:

The results summarized in FIG. 3 indicate that the membrane containing activated carbon produced a faster reaction rate and was capable of breaking down the entire DFP challenge within 24 hours of exposure on films hydrated to a water activity (Aw) of 1.0 (at 100% relative humidity). Data for 80% relative humidity reactions show that the membrane containing activated carbon was capable of degrading over 50% of the applied DFP on the material at 80% RH within 24 hours, while the control without carbon was unreactive after an exposure time exceeding 40 hours. The results of this study demonstrate that activated carbon particles, when added to the composition, enhance the hydrolysis of DFP.

Example 3

Effect of the Presence of Activated Carbon Particles on Agent Surrogate Degradation and Surrogate Permeation Chemical simulant dimethyl methyl phosphonate (DMMP) was used to measure vapor permeation through PVAM/PEI/Carbon and PVAM/PEI control liners with various cover fabrics. The cover fabrics used in the example are Fabric C which corresponds to a chemically treated NYCO (a blend of nylon and cotton) and Fabric N which corresponds to a durable-water repellent treated NYCO. Three different material configurations were tested using a dynamic diffusion dual flow test that is listed in the TOP-8-2-501 using the Aerosol/Vapor/Liquid/Gas (AVLAG) cell that holds the fabric samples that have been conditions at a specified relative humidity of 80% before and during the test. A sweep stream across the bottom surface of the fabrics measures the concentration of permeating DMMP vapor after 10 microliter drops are applied to the cover fabric on the top surface of the sample. A flow of 50 liters/min of nitrogen is swept across the DMMP drops, and the concentration of permeating vapor is measured with a flame ionization detector and recorded. The results are shown in Table 2. After comparing the breakthrough concentrations to a calibrated amount of DMMP without the sample present, it was found that there was no breakthrough after 23 hours of testing with any of the material configurations shown in Table 2. This test demonstrates that the reactive membranes described in Table 2 are capable of functioning as barriers to the chemical warfare agent surrogate DMMP.

TABLE 2

| DMMP Vapor Breakthrough in Dual Flow Permeation Cell | |
|---|---|
| PVAM/PEI/Carbon + Cover Fabric C | No breakthrough |
| PVAM/PEI Control + Cover Fabric C | No breakthrough |
| PVAM/PEI Control + Cover Fabric N | No breakthrough |

Example 4

DFP Degradation of a Hydrophilic and Microporous Membrane Coating

Using the procedure set out above in the description, the following compositions were prepared:

| | Weight percentage (%) | |
|---|---|---|
| | 64K2 | 64K5 |
| Activated carbon particles | 2 | 5 |
| Polyvinyl alcohol | 5 | 5 |
| Polyethyleneimine | 20 | 20 |
| Polyvinylacetate | 20 | 20 |
| Surfactant | 2 | 2 |
| Crosslinking agent | 2 | 2 |
| Water | 49 | 46 |

The composition was applied using a knife on a polyurethane membrane as a continuous film having a thickness of 75 μm and was cured at 160° C. for 3 minutes.

Figure 4:
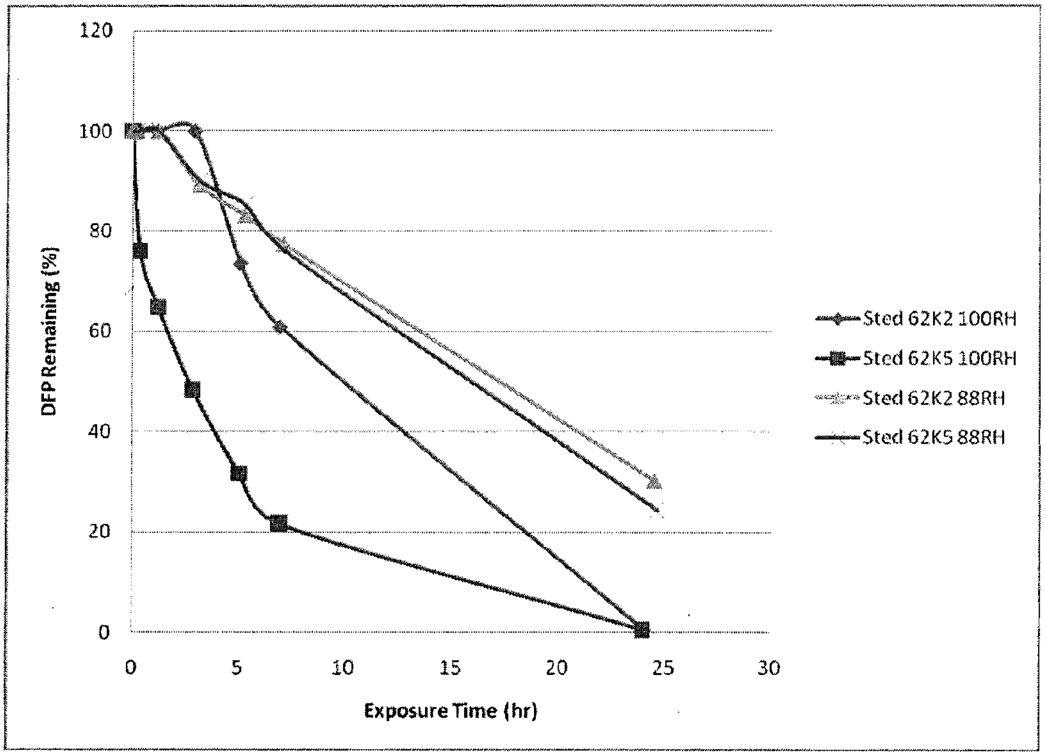
FIG. 4 is a graphic showing the DFP hydrolysis over time on the membrane 64K2 and 64K5 at 100% and 88% relative humidity.

The results, presented in FIG. 4, show a significant reduction of DFP at high and moderate relative humidity. The coating also shows good barrier against chemical warfare agent.

Example 5

Effect of Laundering on Mustard Gas Penetration

Using the procedure set out above for the preparation of the laminate composition, the following membrane was prepared:

| Weight percentage (%) | |
|---|---|
| 20% | Mixture 50% Polyvinyl acetate 50% PVOH |
| 16% | Polyethylenimine (Lupasol F WF or Lupasol P WF from BASF) |
| 0.2% | Surfactant (surfynol 104H, 104A or 104E) |
| 5% | Activated carbon powder |
| 2% | Crosslinker such as Polycup 172 |
| 56.8% | Water |

The composition was applied to a microporous expanded polytetrofluoroethylene (ePTFE) membrane and cured at 165° C. for 4 minutes. The samples were laundered 5 or 10 times according to ISO 6330 4B.E. The resulting laminated supports were tested for their resistance to penetration by mustard gas according to the procedure of dynamic flow test of test Operations Procedure (TOP) 8-2-501, Permeation and Penetration of Air-Permeable, Semipermeable, and Impermeable Materials with Chemical Agents or Simulants (Swatch Testing), Office of the Undersecretary of Defense, March 1997. The test parameters were as follows:

| Parameter | Standard |
|---|---|
| Convective Flow Test Through the Swatch | Flow based on ΔP of 0.1 iwg[a] across the material. |
| Dynamic Diffusion (dual flow) | |
| Top | 0.25 L/min |
| Bottom | 0.30 L/min |
| Static Diffusion (single flow) | |
| Top | 0 L/min |
| Bottom | 1 L/min |
| Type of cell | 10 $cm^2$ area. Fitted with an agent challenge port. |
| Polyethylene film | None. |
| Challenge mass | 10 $g/m^2$ |
| Number of drops and volume of: | |
| Distilled mustard | Eight 1 μL drops |
| Relative humidity (RH) | 80 ± 8 percent |
| Agent purity | >85 percent |
| Chemical analysis method | Bubblers, solid sorbent tubes, MINICAMS ®(Miniature Automatic Continuous Air Monitoring System ®) or equivalent. |
| Length of test: | |
| Convective flow | 8 to 24 hours |
| Dynamic diffusion | 8 to 24 hours |
| Areas sampled | Top or top and bottom of each test swatch based on test requirement. |
| Test control swatches | Randomly placed. |

The results are shown in Table 3.

TABLE 3

Chemical resistance of the laminated support comprising polyvinyl acetate to mustard gas (HD)

| System | Film | Agent | Cumulative agent vapour penetration (μg/$cm^2$) 2 hrs | 4 hrs | 8 hrs |
|---|---|---|---|---|---|
| Unwashed: sample 1 | yes | HD | 0.0 | 0.0 | 0.0 |
| Unwashed: sample 2 | yes | HD | 0.0 | 0.0 | 0.0 |
| 5 washes at 60° C.: sample 1 | yes | HD | 0.0 | 0.1 | 0.3 |
| 5 washes at 60° C.: sample 2 | yes | HD | 0.0 | 0.1 | 0.3 |

TABLE 3-continued

Chemical resistance of the laminated support comprising polyvinyl acetate to mustard gas (HD)

| System | Film | Agent | Cumulative agent vapour penetration (μg/$cm^2$) 2 hrs | 4 hrs | 8 hrs |
|---|---|---|---|---|---|
| 10 washes at 60° C.: sample 1 | yes | HD | 0.2 | 2.2 | 7.1 |
| 10 washes at 60° C.: sample 2 | yes | HD | 0.2 | 2.6 | 8.5 |

The results obtained meet the requirement of NFPA 1994 class II. The test procedure and measurements were done in accordance with ASTM F 1154 (Standard Practice for Qualitatively Evaluating the Comfort, Fit, Function, and Integrity of Chemical Protective Suit Ensembles.

Example 6

DFP Destruction and Water Permeation on Zeolite-Containing Membranes

The composition was applied to a microporous expanded polytetrofluoroethylene (ePTFE) membrane, with an admixture of either zeolite or powdered carbon. Samples were tested for water vapor permeation in a dynamic permeation test cell. The water vapor test procedure and measurements were done in accordance with ASTM F 2298 (ASTM F2298-03(2009)e1 Standard Test Methods for Water Vapor Diffusion Resistance and Air Flow Resistance of Clothing Materials Using the Dynamic Moisture Permeation Cell). Furthermore, the DFP test was performed on 100% relative humidity conditioned membranes using the NMR technique described earlier in Example 1. The results are shown in Table 4, Table 5 and FIG. 5.

TABLE 4

Water vapor permeability of three zeolite/carbon compositions

| | Water Vapor Permeation $g/m^2$-day |
|---|---|
| Sample 1 (Stedfast 014) with 5% Zeolite A | 1286 |
| Sample 2 (Stedfast 901C) with 5% Zeolite A and 5% carbon | 1233 |
| Sample 3 (Stedfast 901) with 5% Zeolite B | 1655 |

This permeation testing shows that membranes containing zeolite and carbon material in the polymeric membrane possess good water vapor permeability indicating good capability for sweat evaporation. The composition of Sample 3 with Zeolite B exhibits particularly good water vapor permeation.

Table 5 lists the reaction rates for the decomposition of DFP by three membrane compositions containing zeolite or zeolite and carbon. The carbon-containing membrane, Sample 2, exhibits the highest reaction rates of the three samples tested.

TABLE 5

DFP reaction on three zeolite/carbon compositions

| | Half-life of DFP (hr) |
|---|---|
| Sample 1 (Stedfast 014) with 5% Zeolite A | 9.0 |
| Sample 2 with 5% Zeolite A (Stedfast 901C) and 5% carbon | 5.8 |
| Sample 3 (Stedfast 901) with 5% Zeolite B | 8.9 |

Figure 5:
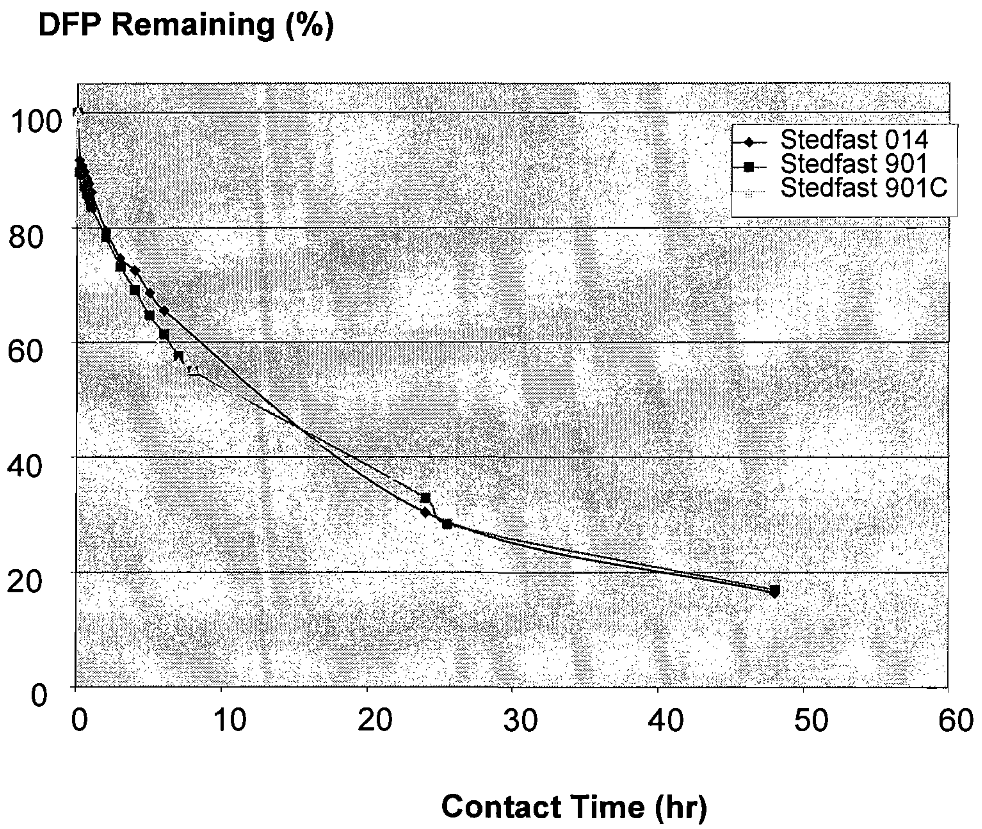
FIG. 5 is a graphic showing the reaction rates for zeolite combined with activated carbon vs. carbon membranes at 84% and 100% relative humidity.

Furthermore, FIG. 5 shows that the membrane composition containing zeolite and carbon exhibited faster initial reaction kinetics than either of the zeolite compositions alone. However, after time, all membranes depleted the same amount of DFP in 24 hours.

While the present invention has been described in connection with a specific embodiment thereof and in a specific use, various modifications will occur to those skilled in the art without departing from the spirit and scope of the invention as set forth in the appended claims. While the following claims are intended to recite the features of the invention, it will be apparent to those of skill in the art that certain changes may be made without departing from the scope of this invention.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A composition for protection against harmful or noxious agents comprising:
- a) from 1 to 95% by weight of a porous media;
- b) from 2 to 60% by weight of an aliphatic amine or hydrophilic amine polymer or monomer;
- c) from 0.1 to 10% by weight of a surfactant agent;
- d) from 0.1 to 10% by weight of an epoxy resin or of a crosslinking agent;
- e) from 5 to 20% by weight of a polyvinyl acetate polymer or copolymer;
- f) from 0.1 to 10% by weight of a defoamer agent and,
- g) from 10 to 90% by weight of water.

2. The composition of claim 1, wherein said harmful or noxious agents are neutralized or decontaminated when they are contacted with said composition.

3. The composition of claim 1, further comprising:
- h) from 0 to 20% by weight of a polyvinyl alcohol polymer or copolymer;
- i) from 0 to 60% by weight of a polyurethane polymer;
- j) from 0 to 60% by weight of an acrylic polymer; and,
- k) from 0 to 5% by weight of one or more metal salts or oxides.

4. The composition of claim 1, wherein said porous media is activated carbon particles or zeolite.

5. The composition of claim 4, wherein said activated particles are in the form of powder, beads, granules or nanotubes.

6. The composition of claim 1, wherein said porous media is a carbon fabric.

7. The composition of claim 6, wherein said carbon fabric is in the form of a fiber, woven cloth, non-woven cloth, knit cloth or filter.

8. The composition of claim 1, wherein said porous media is a combination of activated carbon and zeolite.

9. The composition of claim 1, wherein said aliphatic amine or hydrophilic amine polymer or monomer is polyethylenimine.

10. The composition of claim 1, wherein said polyvinyl acetate polymer or copolymer is ethylene vinyl acetate.

11. A method of preparing a laminated support using a laminate composition of claim 1; said method comprising casting said laminate composition on a solid support to yield said laminated support and curing said laminated support.

12. A laminated support comprising one or more layers of the composition of claim 1.

13. The laminated support of claim 12 combined with one or more layers of the composition comprising:
- a) from 2 to 60% by weight of an aliphatic amine or hydrophilic amine polymer or monomer;
- b) from 0 to 10% by weight of a surfactant agent;
- c) from 0 to 10% by weight of an epoxy resin or of a crosslinking agent;
- d) from 0 to 90% by weight of a polyvinyl acetate polymer or copolymer;
- e) from 0 to 20% by weight of a polyvinyl alcohol polymer or copolymer;
- f) from 0 to 60% by weight of a polyurethane polymer;
- g) from 0 to 60% by weight of an acrylic polymer;
- h) from 0 to 5% by weight of one or more metal salts or metal oxides;
- i) from 0 to 10% by weight of a defoamer agent; and
- j) from 10 to 90% by weight of water.

14. The laminated support of claim 13, wherein said aliphatic amine or hydrophilic amine polymer is replaced by a vinyl amine and polyvinyl alcohol copolymer.

15. The laminated support of claim 12, wherein said porous media used is a combination of activated carbon and zeolite.

* * * * *